United States Patent
Nagendra et al.

(10) Patent No.: US 7,657,881 B2
(45) Date of Patent: Feb. 2, 2010

(54) USING OPTIMIZED LIBRARIES TO IMPROVE PERFORMANCE OF DEPLOYED APPLICATION CODE AT RUNTIME

(75) Inventors: Gururaj Nagendra, Shrewsbury, MA (US); Stewart N. Taylor, Menlo Park, CA (US)

(73) Assignee: Intel Corporation, Santa Clara, CA (US)

(*) Notice: Subject to any disclaimer, the term of this patent is extended or adjusted under 35 U.S.C. 154(b) by 724 days.

(21) Appl. No.: 11/019,803

(22) Filed: Dec. 21, 2004

(65) Prior Publication Data

US 2006/0136712 A1  Jun. 22, 2006

(51) Int. Cl.
*G06F 9/45* (2006.01)
(52) U.S. Cl. .................. 717/152; 717/136; 717/143; 717/157
(58) Field of Classification Search ............ 717/148, 717/151, 153, 136, 140, 143, 152, 157; 713/150
See application file for complete search history.

(56) References Cited

U.S. PATENT DOCUMENTS

| | | | | |
|---|---|---|---|---|
| 4,763,255 A * | 8/1988 | Hopkins et al. | ............. | 717/153 |
| 5,815,721 A * | 9/1998 | Benitez | ............ | 717/160 |
| 5,999,732 A * | 12/1999 | Bak et al. | ............... | 717/148 |
| 6,292,934 B1 * | 9/2001 | Davidson et al. | ............ | 717/158 |
| 6,305,013 B1 * | 10/2001 | Miyamoto | ................ | 717/146 |
| 6,332,215 B1 | 12/2001 | Patel et al. | | |
| 6,473,897 B1 * | 10/2002 | Ansari et al. | .............. | 717/136 |
| 2003/0070161 A1 | 4/2003 | Wong et al. | | |
| 2005/0028148 A1 * | 2/2005 | Civlin | ......................... | 717/145 |
| 2005/0071833 A1 * | 3/2005 | Rothman et al. | ............ | 717/153 |
| 2005/0108687 A1 * | 5/2005 | Mountain et al. | ........... | 717/127 |
| 2005/0289519 A1 * | 12/2005 | Sazegari et al. | ............. | 717/136 |

FOREIGN PATENT DOCUMENTS

| | | |
|---|---|---|
| EP | 0 945 791 | 9/1999 |
| EP | 1 3113 012 | 5/2003 |
| WO | WO 02/41145 | 5/2002 |

OTHER PUBLICATIONS

BEA Whitepaper: "BEA Weblogic JRockit: Java for the Enterprise", BEA Systems, Inc. Dec. 2003.*
Chiba, et al., "An Easy-to-Use Toolkt for Efficient Java Bytecode Translators", Proc. of 2nd Int'l Conf. on Generative Programming and Component Engineering (GPCE '03) LNCS 2830, pp. 364-376, Springer-Verlag, 2003.*
Micheli, et al., "Complex Library Mapping for Embedded Software Using Symbolic Algebra", ACM 1-58113-461-4/02/0006, DAC 2002, Jun. 10, 2002.*

(Continued)

*Primary Examiner*—Wei Y Zhen
*Assistant Examiner*—Ryan D Coyer
(74) *Attorney, Agent, or Firm*—Blakely, Sokoloff, Taylor & Zafman LLP (57) ABSTRACT

A method to automatically replace computationally intensive functions with optimized functions in managed code is disclosed. If the underlying processor has associated optimized functions, managed application code is disassembled and parsed to find computationally intensive functions. The computationally intensive functions are then replaced with optimized functions, and the application code is re-compiled if necessary.

23 Claims, 5 Drawing Sheets

OTHER PUBLICATIONS

BEA Whitepaper: "BEA Weblogic JRockit: Java for the Enterprise", BEA Systems, Inc. Dec. 2003, 23 pages.*

Bradski et al., "Intel's Computer Vision Library: Applications in calibration, stereo, segmentation, tracking, gesture, face, and object recognition"; IEEE, 2000, 2 pages.*

Micheli et al., "Complex Library Mapping for Embedded Software Using Symbolic Algebra", ACM, DAC 2002, Jun. 10, 2002, 6 pages.*

Vinciguerra et al., "An Experimental Framework for Evaluating Disassembly and Decompilation Tools for C++ and Java"; IEEE, 2003, 10 pages.*

International Search Report for PCT/US2005/002989, Jun. 30, 2005, 5 pages.

Written Opinion of the International Searching Authority for PCT/US2005/002989, Jun. 30, 2005, 8 pages.

BEA Systems, Whitepaper entitled "Bea WebLogic Jrockit™: Java for the Enterprise"; pp. 23, Dec. 2003 source: http://www.bea.com/content/news_events/white_papers/BEA_JRockit_wp.pdf.

* cited by examiner

USING OPTIMIZED LIBRARIES TO IMPROVE PERFORMANCE OF DEPLOYED APPLICATION CODE AT RUNTIME

BACKGROUND

The present invention relates to managed applications and more specifically to improving the performance of deployed managed applications.

A managed application is an application that runs on top of a managed virtual machine (VM). Examples of virtual machines include the Java Virtual Machine (JVM) and the Microsoft .NET Common Language Runtime (CLR).

The performance of a managed application is typically optimized during development of the application by the software developer. Portions of the application to be optimized may be identified via performance analysis based on running real-world and industry standard workloads. After managed applications are installed by end users or by Information Technology (IT) departments, the performance of the applications is typically not optimized any further. Moreover, software vendors do not offer guaranteed performance optimizations for improving the performance of the compute-intensive functionality in the applications to take advantage of underlying processor architecture capabilities or deployment of next generation processor technologies.

Figure 1:
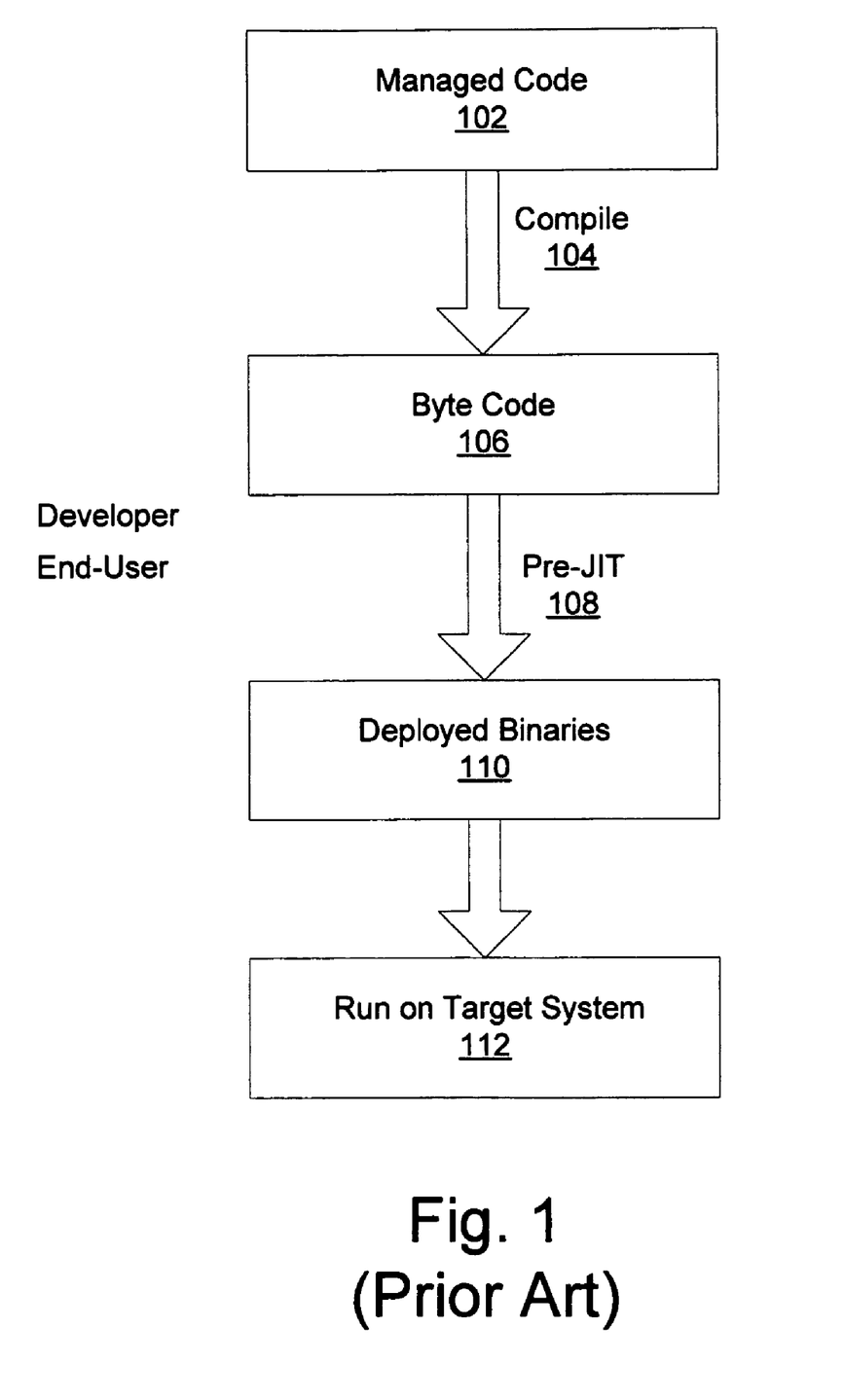
FIG. 1 is a flow diagram which illustrates a prior art method of deploying a managed application to an end user

FIG. 1 is a flow chart which illustrates the current model for providing a managed application to an end user. A software developer (101) writes managed code (102), which is compiled (104) to create byte code (106). The developer then provides the byte code to a customer or end user (107), who may run a pre-JIT compiler, such as Microsoft's .NET Native Image Generator (NGEN). The pre-JIT compiler creates deployed binaries (110), which may then be run on a target system (112).

BRIEF DESCRIPTION OF THE DRAWINGS

A better understanding of the present invention can be obtained from the following detailed description in conjunction with the following drawings, in which.

DETAILED DESCRIPTION OF THE PRESENT INVENTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern replacing computationally-intensive functions in deployed managed applications with optimized functions. Embodiments of the present invention may be practiced in support of any managed runtime environment, including NET, Java, and Mono managed runtime environments, or any other managed runtime environment.

Although compilers may provide some optimization, they are inefficient compared to optimized libraries containing hand-optimized functions for performance improvement on known kernels. For example, transcendental operations, such the "log" instruction provided by the Intel® x86 architecture, may not be as efficient as a hand-optimized function that uses the processor instructions efficiently.

The x86 log function is shown below:

```
double call_log(double x)
{
    return log(x);
}
```

This function may be custom optimized using Streaming SIMD Extensions (SSE2) instructions to achieve the highest possible performance. The custom optimization of this function using SSE2 instructions is as follows:

```
        ALIGN   4
        PUBLIC _call_log
_call_log PROC NEAR
; parameter 1: 12 + esp
    $B1$1:
; Preds $B1$0
        sub esp, 8
;5.1
        fld QWORD PTR [esp+12]
;4.8
        fstp QWORD PTR [esp]
;6.10
        call _log$J
;6.10
; LOE ebx ebp esi edi fl
    $B1$4:
; Preds $B1$1
        add esp, 8
;6.10
        ret
;6.10
        ALIGN   4
; LOE
; mark_end;
_call_log ENDP
;_call_log ENDS
```

The optimized log function provides a substantial performance gain over the x86 provided log function.

Similar custom optimizations may be provided for a wide range of compute-intensive functions to be executed on a variety of processors and/or platforms. An optimized library function, or optimized function, is defined as a function which uses processor-specific instructions, including but not limited to SSE, SSE2, and Multimedia Extensions (MMX) instructions, to improve performance. Optimized functions may include, but are not limited to functions related to cryptography, string processing, audio, video, image processing, speech coding, speech recognition, 3D, math, and Extensible Markup Language (XML). These and other functions may be optimized for different functional domains, including, but not limited to, desktop or mobile platforms using Intel Pentium® processors, server or workstation platforms using the Intel Itanium® processors, and cellular or handheld platforms using Intel XScale® technology. Optimized functions, such as those described above, may be provided to an end-user in an optimized library, and may be provided in the form of Intel® Integrated Performance Primitives (IPPs).

When new instructions are added to next-generation microprocessors, optimized functions may be provided to improve the performance of new compute-intensive functionality in existing applications. In one embodiment, optimized functions may replace computationally intensive functions in deployed managed applications without any developer involvement in the optimization deployment process on the end-user machine.

Figure 2:
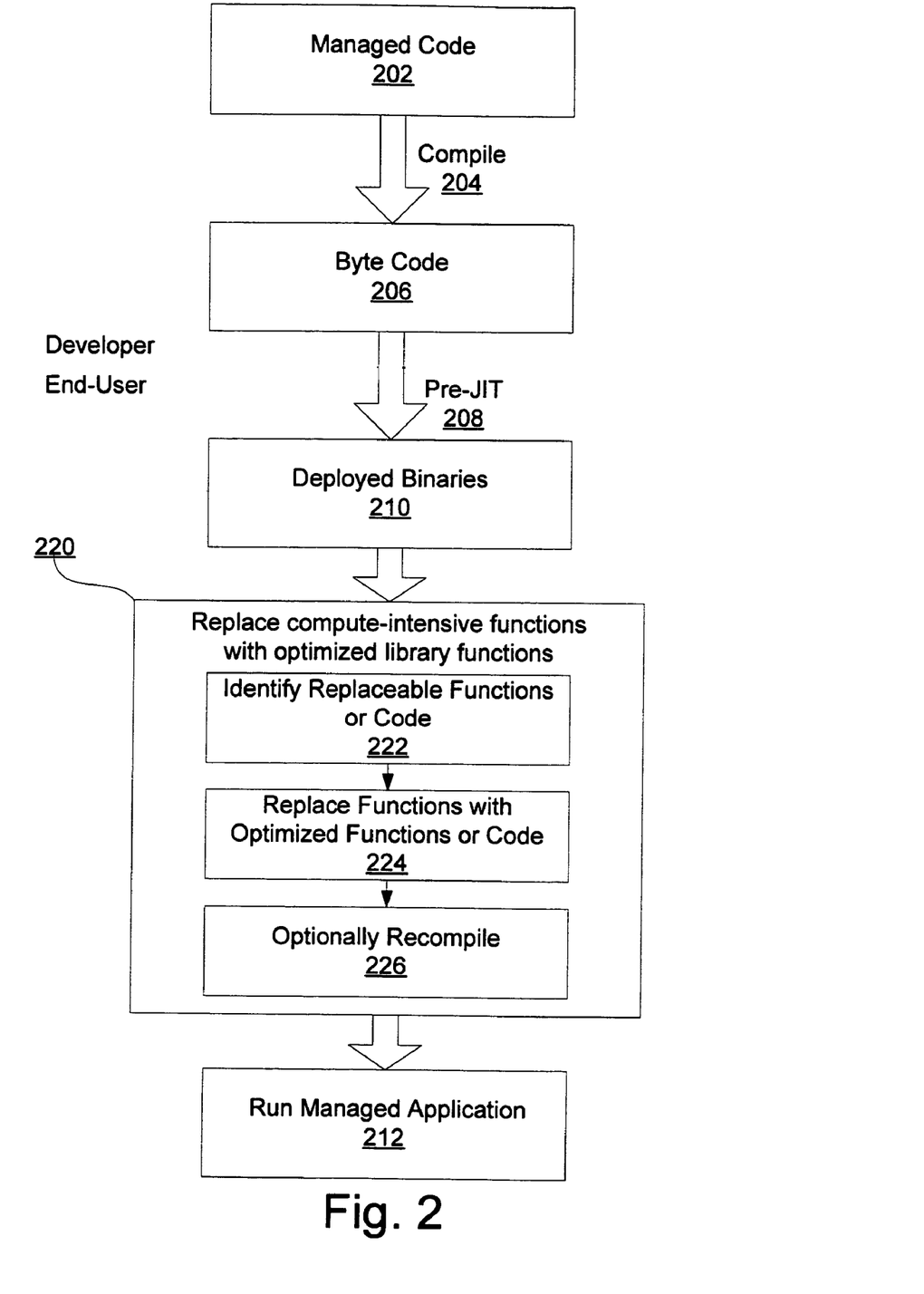
FIG. 2 is a flow diagram which illustrates a method of improving the performance of a managed application according to one embodiment of the present invention

FIG. 2 is a flowchart which illustrates a method by which computationally intensive functions in deployed managed applications may be replaced by optimized functions such as those described above according to one embodiment of the present invention. Computationally intensive functions may be defined as those functions for which corresponding optimized functions or optimized blocks of code are available. Examples of computationally intensive functions include, but are not limited to: transcendental functions, cryptography functions, string processing functions, audio functions, video functions, image processing functions, speech coding functions, speech recognition functions, 3D functions, math functions, and Extensible Markup Language (XML) functions.

A software developer (201) writes managed code (202), which is compiled (204) to create byte code (206). The developer then provides the byte code to a customer or end user (207), who may run a pre-JIT compiler, such as Microsoft's .NET Native Image Generator (NGEN). The pre-JIT compiler creates deployed managed application binaries (210).

In one embodiment of the invention, after the managed code has been pre-JITed, the computationally intensive functions within the managed code are replaced with optimized functions, as illustrated in block 220.

To perform the replacement, first the computationally intensive functions or blocks of code are identified, as shown by block 222. Next, the identified functions or blocks of code are replaced by the optimized library functions, or by optimized code, as shown by block 224. In one embodiment, the optimized library may contain Intel® Integrated Performance Primitives (IPP). In another embodiment, the optimized library may contain other optimized functions, such as those described above. Finally, all or part of the pre-JITed code may be optionally re-compiled, as shown by block 226.

After the computationally intensive functions have been replaced with optimized functions, and the managed application is recompiled, if necessary, the managed application may then be run on a target system (212). The modified managed application may have improved functional performance at run-time after the replacement of computationally intensive functions with optimized functions.

Figure 3:
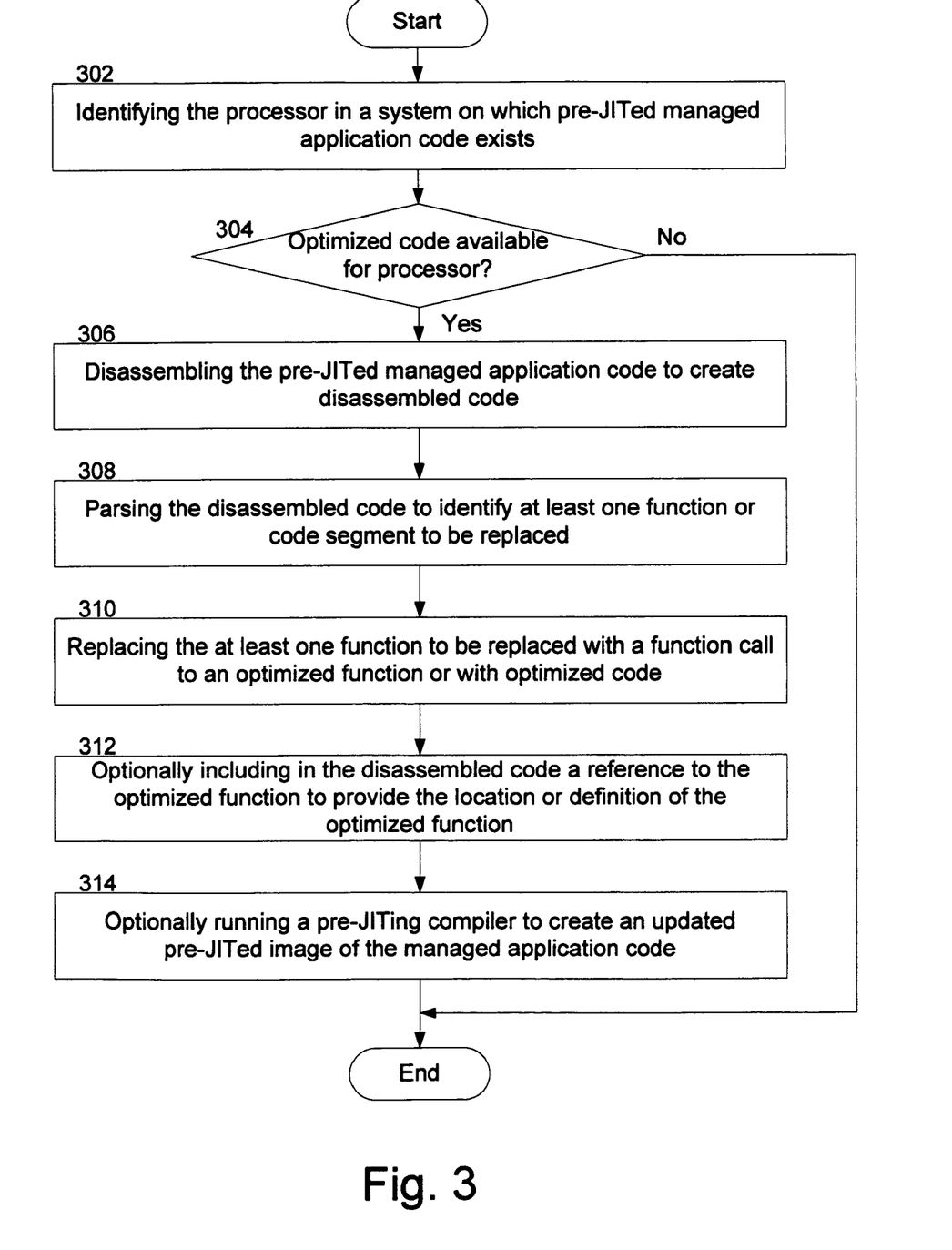
FIG. 3 is a flow diagram which illustrates a method of improving the performance of a managed application according to one embodiment of the present invention

FIG. 3 is a flow diagram which illustrates a method for implementing the replacement of computationally intensive functions according to one embodiment of the present invention. Although the following operations may be described as a sequential process, some of the operations may be performed in parallel or concurrently. In addition, the order of the operations may be re-arranged without departing from the spirit of embodiments of the invention.

First, as shown in block 302, the processor of the system on which the managed application code exists is identified. Determining the identity of the processor which will run the managed application allows the appropriate custom optimized functions to be identified. For example, if the underlying processor is identified as an Intel Itanium® processor, functions that have been optimized for this processor will be used to achieve optimum performance. In one embodiment, identification of the underlying processor may be achieved through the use of the processor ID.

If no optimized code exists for the identified processor, as shown in block 304, there is no need to perform a replacement of the computationally intensive functions. The pre-JITed managed application code may be run with no further modifications.

If optimized code exists for the identified processor, the performance of the managed application may be improved by replacing the computationally intensive functions with optimized functions. In one embodiment, before the replacement is performed, the managed application binaries or pre-JITed managed application code may be disassembled to create disassembled code, as shown by block 306. The disassembled code may then be parsed to identify at least one computationally intensive function or code block to be replaced by an optimized function or optimized code block, as shown by block 308.

After the function(s) to be replaced have been identified, they are replaced, as illustrated by block 310. In one embodiment, a byte code binary translator may be used to perform the replacement. In one embodiment, the function(s) to be replaced may be replaced by a call to an optimized library function. In another embodiment, the function(s) to be replaced may be replaced by an optimized block of code. This is referred to as in-lining.

If one or more of the functions to be replaced is replaced by a call to an optimized library function, the disassembled code may be modified to include a reference to the optimized function, as shown in block 312. The reference to the optimized function may provide the location or the definition of the optimized function. In one embodiment, a literal INCLUDE statement may be used to identify the library which contains the optimized function.

Finally, as shown in block 314, a pre-JITing compiler may be run to create an updated pre-JITed image of the managed application code. In some embodiments, it may not be necessary to re-compile the managed application code. In other embodiments, only portions of the managed application code may need to be compiled. For example, if a computationally intensive function is replaced with optimized code, the portion of the managed application containing the newly added optimized code may require re-compiling.

Figure 4:
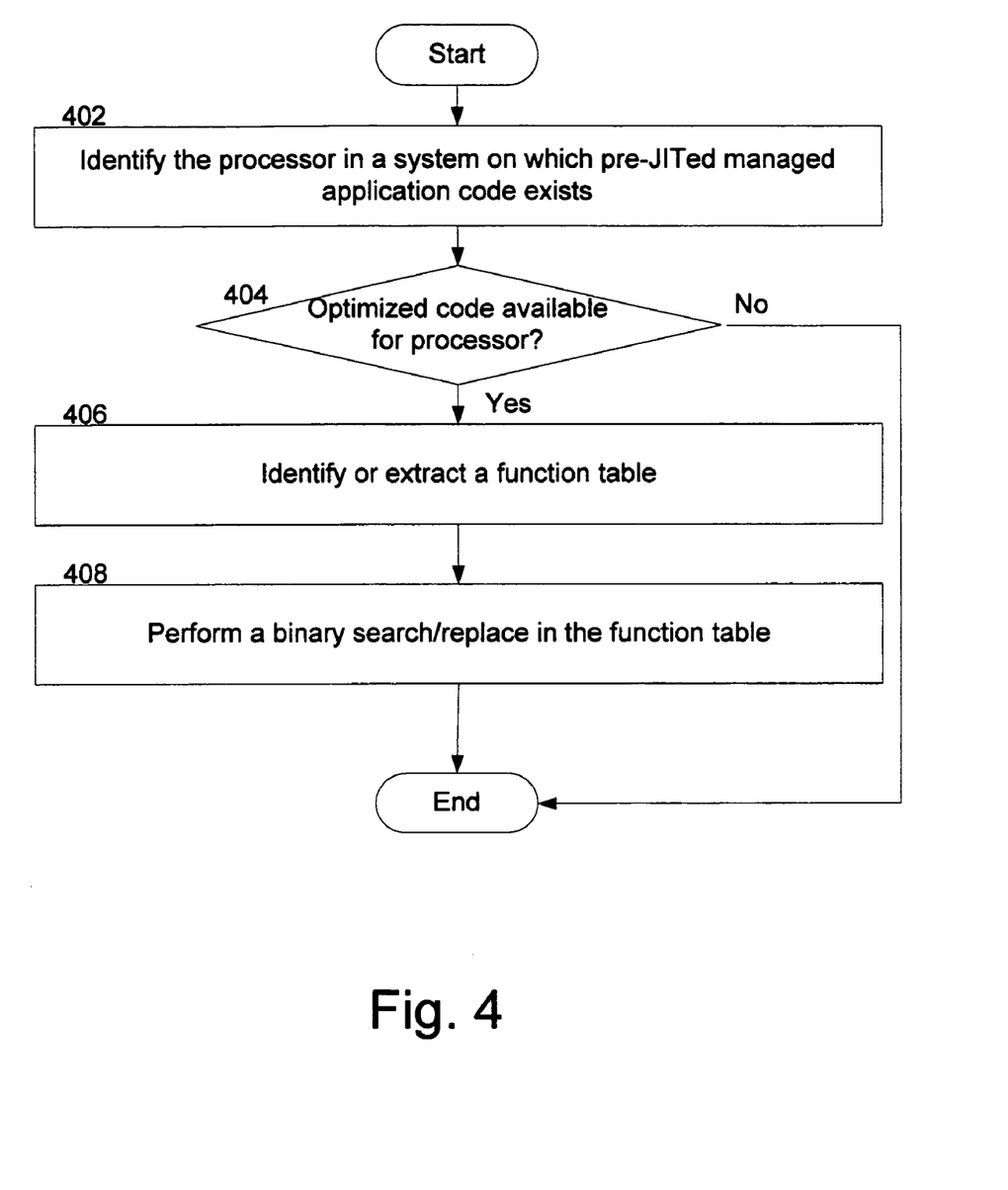
FIG. 4 is a flow diagram which illustrates a method of improving the performance of a managed application according to one embodiment of the present invention

FIG. 4 is a flow diagram which illustrates a method for implementing the replacement of computationally intensive functions according to another embodiment of the present invention.

As described above, the underlying processor is identified as shown in block 402. If optimized code is available for the underlying processor, as shown in block 404, computationally intensive functions may be replaced.

A function table may be identified or extracted from the pre-JITed managed application code, as shown by block 406. The function table may be a binary call table, and may contain all of the functions used in the managed application. A binary search and replace may be performed on the function table, to replace one or more computationally intensive functions with corresponding optimized functions from an optimized library, such as a library containing Intel® IPPs.

The methods set forth above may be implemented via instructions stored on a machine-accessible medium which are executed by a processor. The instructions may be implemented in many different ways, utilizing any programming code stored on any machine-accessible medium. A machine-accessible medium includes any mechanism that provides (i.e., stores and/or transmits) information in a form readable by a machine, such as a computer. For example, a machine-accessible storage medium includes random-access memory (RAM), such as static RAM (SRAM) or dynamic RAM (DRAM); ROM; magnetic or optical storage medium; flash memory devices, and a machine-accessible propagation medium includes electrical, optical, acoustical or other form of propagated signals (e.g., carrier waves, infrared signals, digital signals); etc.

Embodiments of the present invention may be performed at the time the managed application is installed, or may be performed after the deployed managed application runs. In one embodiment, performance hotspot functions (i.e. computationally intensive functions) may be identified using data collected by runtime performance profiling tools. These performance hotspot functions may then be replace by optimized library functions. When new optimized library functions are deployed, embodiments of the present invention may be performed again, in order to update the managed application with the most recently optimized functions. Furthermore, if a system upon which a managed application runs is upgraded with a different processor having corresponding different optimized functions available, embodiments of the present invention may be performed to update the managed application with optimized functions for the processor on which it is running. Thus, embodiments of the present invention provide the end user of managed applications the ability to improve functional performance of the managed application at runtime, independent of the initial level of optimization provided by the software vendor and subsequent platform upgrades.

Figure 5:
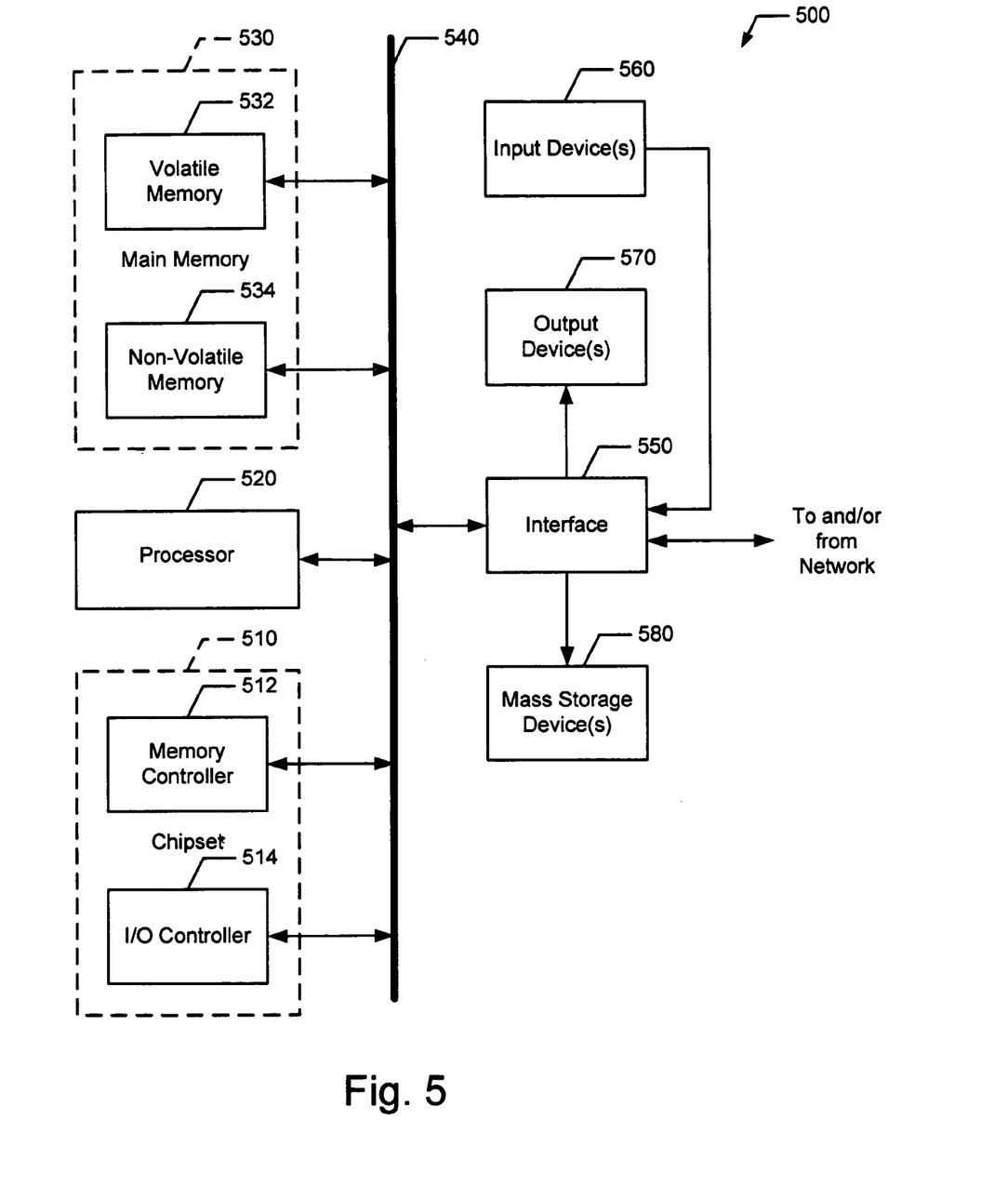
FIG. 5 is an illustration of a system block diagram according to one embodiment of the present invention.

FIG. 5 is a block diagram of an example system (500) adapted to implement the methods disclosed herein according to an embodiment. The system (500) may be a desktop computer, a laptop computer, a notebook computer, a personal digital assistant (PDA), a server, a workstation, a cellular telephone, a mobile computing device, an Internet appliance or any other type of computing device. In another embodiment, the system used to implement the methods disclosed herein may be a system on a chip (SOC) system.

The system (500) includes a chipset (510), which may include a memory controller (512) and an input/output (I/O) controller (514). A chipset typically provides memory and I/O management functions, as well as a plurality of general purpose and/or special purpose registers, timers, etc. that are accessible or used by a processor (520). The processor (520) may be implemented using one or more processors.

The memory controller (512) may perform functions that enable the processor (520) to access and communicate with a main memory (530) including a volatile memory (532) and a non-volatile memory (534) via a bus (540).

The volatile memory (532) may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory (534) may be implemented using flash memory, Read Only Memory (ROM), Electrically Erasable Programmable Read Only Memory (EEPROM), and/or any other desired type of memory device.

Memory (530) may be used to store information and instructions to be executed by the processor (520). Memory (530) may also be used to store temporary variables or other intermediate information while the processor (520) is executing instructions.

The system (500) may also include an interface circuit (550) that is coupled to bus (540). The interface circuit (550) may be implemented using any type of well known interface standard such as an Ethernet interface, a universal serial bus (USB), a third generation input/output interface (3GIO) interface, and/or any other suitable type of interface.

One or more input devices (560) are connected to the interface circuit (550). The input device(s) (560) permit a user to enter data and commands into the processor (520). For example, the input device(s) (560) may be implemented by a keyboard, a mouse, a touch-sensitive display, a track pad, a track ball, and/or a voice recognition system.

One or more output devices (570) may be connected to the interface circuit (550). For example, the output device(s) (570) may be implemented by display devices (e.g., a light emitting display (LED), a liquid crystal display (LCD), a cathode ray tube (CRT) display, a printer and/or speakers). The interface circuit (550), thus, typically includes, among other things, a graphics driver card.

The system (500) also includes one or more mass storage devices (580) to store software and data. Examples of such mass storage device(s) (580) include floppy disks and drives, hard disk drives, compact disks and drives, and digital versatile disks (DVD) and drives.

The interface circuit (550) may also include a communication device such as a modem or a network interface card to facilitate exchange of data with external computers via a network. The communication link between the system (500) and the network may be any type of network connection such as an Ethernet connection, a digital subscriber line (DSL), a telephone line, a cellular telephone system, a coaxial cable, etc.

Access to the input device(s) (560), the output device(s) (570), the mass storage device(s) (580) and/or the network is typically controlled by the I/O controller (514) in a conventional manner. In particular, the I/O controller (514) performs functions that enable the processor (520) to communicate with the input device(s) (560), the output device(s) (570), the mass storage device(s) (580) and/or the network via the bus (540) and the interface circuit (550).

While the components shown in FIG. 5 are depicted as separate blocks within the system (500), the functions performed by some of these blocks may be integrated within a single semiconductor circuit or may be implemented using two or more separate integrated circuits. For example, although the memory controller (512) and the I/O controller (514) are depicted as separate blocks within the chipset (510), persons of ordinary skill in the art will readily appreciate that the memory controller (512) and the I/O controller (514) may be integrated within a single semiconductor circuit.

Thus, a method, machine readable medium, and system for using optimized libraries to improve performance of deployed application code at runtime are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method to optimize a managed application in an end-user system, the managed application to be executed on a processor in the end-user system, comprising:

determining one or more functions optimized for the processor;

disassembling binaries of the managed application to create disassembled code when the processor is not executing the binaries of the managed application responsive to the determination;

parsing the disassembled code to identify one or more computationally intensive functions to be replaced; and replacing each computationally intensive function with at least one of the one or more functions optimized for the processor, wherein the one or more functions optimized for the processor are part of an optimized library and wherein replacing each computationally intensive function with the at least one of the one or more functions optimized for the processor comprises replacing each computationally intensive function with one or more function calls to the optimized library.

2. The method of claim 1, wherein the binaries of the managed application comprise pre-JITed managed application code.

3. The method of claim 2, further comprising running a pre-JITing compiler to create a pre-JITed image of the pre-JITed managed application code responsive to replacing each computationally intensive function.

4. The method of claim 1, further comprising including a reference to the at least one of the one or more functions optimized for the processor in the disassembled code.

5. The method of claim 4, wherein including the reference to the at least one of the one or more functions .optimized for the processor comprises providing a location of the at least one of the one or more functions optimized for the processor.

6. The method of claim 4, wherein including the reference to the at least one of the one or more functions .optimized for the processor comprises providing a definition of the at least one of the one or more functions optimized for the processor.

7. The method of claim 1, wherein replacing each computationally intensive function with the at least one of the one or more functions optimized for the processor comprises replacing each computationally intensive function with code.

8. The method of claim 1, wherein at least one of the one or more computationally intensive functions is a transcendental function.

9. The method of claim 1, wherein at least one of the one or more computationally intensive functions is selected from the group consisting of cryptography functions, string processing functions, audio functions, video functions, image processing functions, speech coding functions, speech recognition functions, 3D functions, math functions, and Extensible Markup Language (XML) functions.

10. The method of claim 1, wherein replacing each computationally intensive function with the one or more function calls to the optimized library comprises using a byte code binary translator to perform the replacement.

11. A method to optimize a managed application in an end-user platform, the managed application to be executed on a processor in the end-user platform, comprising:
determining that disassembled binaries of the managed application are to be executed on the processor in the end-user platform, wherein an optimized library is available for the processor; and
extracting a function table comprising a list of at least one computationally intensive function from the binaries of the managed application and performing a search and replace function on the function table to replace the at least one computationally intensive function with a corresponding optimized function from the optimized library when the processor is not executing the binaries of the managed application responsive to the determination.

12. The method of claim 11, wherein the function table is a binary call table.

13. The method of claim 11, wherein the corresponding optimized function is to use at least one of Streaming SIMD Extensions (SSE), SSE2, and Multimedia Extensions (MMX) instructions.

14. A system, comprising:
a bus;
a processor coupled to the bus; and
memory coupled to the processor, the memory to store instructions, which upon execution by the processor, cause the processor to:
determine one or more functions optimized for the processor;
disassemble binaries of a managed application to create disassembled managed application code when the processor is not executing the binaries of the managed application responsive to the determination;
identify functions in the disassembled managed application code to be replaced; and
replace the identified functions with a call to an optimized library containing the one or more functions optimized for the processor.

15. The system of claim 14, wherein the identified functions are selected from the group consisting of cryptography functions, string processing functions, audio functions, video functions, image processing functions, speech coding functions, speech recognition functions, 3D functions, math functions, and Extensible Markup Language (XML) functions.

16. The system of claim 14, wherein the instructions further cause a reference to the one or more functions optimized for the processor to be included in the disassembled managed application code.

17. The system of claim 14, wherein the instructions further cause the disassembled managed application code to be recompiled responsive to replacing the identified functions.

18. An article of manufacture comprising a machine-accessible storage medium having stored thereon instructions which, when executed by a machine, cause the machine to:
identify an underlying microprocessor of the machine;
disassemble binaries of a managed application to create disassembled code when the underlying processor is not executing the binaries of the managed application responsive to the determination;
parse the disassembled code to identify at least one function to be replaced; and
replace the at least one function to be replaced with a call to an optimized library containing an optimized function, wherein the optimized function is optimized for the underlying microprocessor.

19. The article of manufacture of claim 18, wherein the instructions further cause the machine to compile the disassembled code responsive to replacing the at least one function.

20. The method of claim 1, wherein the one or more functions optimized for the processor comprise Integrated Performance Primitives (IPP).

21. The method of claim 11, wherein the corresponding optimized function is an Integrated Performance Primitive (IPP).

22. The system of claim 14, wherein the one or more functions optimized for the processor comprise Integrated Performance Primitives (IPP).

23. The article of manufacture of claim 18, wherein the optimized function comprises Integrated Performance Primitives (IPP).

* * * * *